United States Patent
Chang et al.

(10) Patent No.: US 9,508,138 B2
(45) Date of Patent: Nov. 29, 2016

(54) METHOD OF DETECTING PHOTOLITHOGRAPHIC HOTSPOTS

(71) Applicant: Powerchip Technology Corporation, Hsinchu (TW)

(72) Inventors: Yi-Shiang Chang, Changhua County (TW); Chia-Chi Lin, Hsinchu County (TW); Shin-Shing Yeh, Hsinchu (TW); Pei-Shan Shih, Kaohsiung (TW); Jun-Cheng Lai, Hsin-Chu (TW)

(73) Assignee: Powerchip Technology Corporation, Hsinchu (TW)

( * ) Notice: Subject to any disclaimer, the term of this patent is extended or adjusted under 35 U.S.C. 154(b) by 0 days.

(21) Appl. No.: 14/742,717

(22) Filed: Jun. 18, 2015

(65) Prior Publication Data

US 2016/0321793 A1 Nov. 3, 2016

(30) Foreign Application Priority Data

Apr. 30, 2015 (TW) ............................. 104113937 A

(51) Int. Cl.
*G06K 9/00* (2006.01)
*G06T 7/00* (2006.01)
*G06K 9/46* (2006.01)
*G06T 5/00* (2006.01)

(52) U.S. Cl.
CPC ........... *G06T 7/0004* (2013.01); *G06K 9/4604* (2013.01); *G06T 5/00* (2013.01); *G06T 7/0042* (2013.01); *G06T 7/0085* (2013.01); *G06T 2207/30148* (2013.01)

(58) Field of Classification Search
CPC ............ G03F 1/144; G03F 1/26; G03F 1/32; G03F 7/70125; G03F 7/70283
USPC ......................................................... 382/151
See application file for complete search history.

(56) References Cited

U.S. PATENT DOCUMENTS 8,321,818 B2 * 11/2012 Agarwal ................. G03F 1/144
716/51

OTHER PUBLICATIONS

Yang et al: "Imaging quality full chip verification for yield improvement", SPIE 2013.*

* cited by examiner

*Primary Examiner* — Ruiping Li
(74) *Attorney, Agent, or Firm* — Winston Hsu; Scott Margo

(57) ABSTRACT

A method for detecting photolithographic hotspots is disclosed. After receiving layout data, an aerial image simulation is conducted to extract aerial image intensity indices. Based on the combination of one or more aerial image intensity indices, various aerial image detectors are generated. The value of aerial image detectors is verified to determine the position and type of the photolithographic hotspots.

9 Claims, 3 Drawing Sheets

METHOD OF DETECTING PHOTOLITHOGRAPHIC HOTSPOTS

CROSS REFERENCE TO RELATED APPLICATION

This application claims priority from Taiwanese Patent Application No. 104113937, filed on Apr. 30 2015, the contents of which are hereby incorporated by reference in their entirety for all purposes.

BACKGROUND OF THE INVENTION

1. Field of the Invention

The present invention generally relates to a method for detecting a hotspot in a photolithographic image. In particular, the present invention is directed to a method for detecting a hotspot in a photolithographic image according to aerial image intensity-related indices.

2. Description of the Prior Art

Electric circuits, for example integrated circuits (IC), are widely used in various electronic products, such as cars, microwave ovens, or personal computers. The design and fabrication of an IC component involves many steps, and sometimes it is called a design flow. A particular step in a design flow usually depends on the types, the complexity, the design team, the manufacturer or the foundry of the electric circuit. By executing a software simulation program and/or a hardware emulation program, a software tool or a hardware tool is used to exam the design of each stage in a design flow. These examining steps help to find out errors in the design so as to be corrected or improved by the designers or by the engineers.

With the designers and manufacturers continuously increasing the numbers of the circuit elements in each unit area and decreasing the sizes of the circuit elements, the patterns for the circuit elements formed on a substrate are getting smaller and smaller as well as closer and closer to one another. The shrinkage of the critical dimension of the circuit elements makes it harder and harder to fabricate the desirable layout patterns on the substrate. Diffraction of light may partially account for the cause of defects during the lithographic process so that the desirable images fail to be precisely formed on the substrate, and further the defects land in the final element structures.

So far, resolution enhancement techniques (RETs) are used to improve the resolution of the patterns of the mask on the substrate during the lithographic process. For example, an optical proximity correction (OPC) adjusts the amplitude of light passing through a reticle to change the image data of the layout pattern which is set for generating a reticle. For example, the rim of a layout pattern is often adjusted by such techniques to enlarge or to shrink some geometric parts by estimating the overexposure (or the underexposure) of a certain point on a substrate to alter the critical dimension (CD, or namely line width) of a certain part. Apt calibrations of the adjustment greatly improve the overall image fidelity.

However, what is insufficient is that, some layout regions still have imaging problems in spite of the above resolution enhancement techniques. These problematic regions are known as hotspots in this industrial field. The issue of the hotspots can only be corrected by changing the original layout design to alter the profile of the final patterns. For example, hotspots of pinching type are needed to be eliminated by increasing the width of the object's profile while hotspots of bridging type are needed to be eliminated by increasing the space between the profiles of two adjacent objects. The amending flow can be done at the manufacturer's end or at the designer's end. For the former part, the flow may sometimes be called 'retarget' because it involves the adjustment of the drawn patterns which lead to the final electric pattern on a wafer. Although the optical proximity correction or a process window simulation may serve as a guidance of retargeting, the entire amending flow is time-consuming and expensive. Accordingly, the industrial field is still looking for a new technique which is capable of more efficiently locating hotspots and amending a layout design.

SUMMARY OF THE INVENTION

In the light of the need for implementation, the present invention proposes a novel method for detecting a photolithographic hotspot and is characterized in that the layout data with or without the optical proximity correction undergo an aerial image simulation to extract multiple specific aerial image intensity indices and to accordingly generate multiple aerial image detectors of various meanings in order to determine various and corresponding photolithographic hotspots. The method of the present invention may go with a conventional critical dimension (CD) check after the optical proximity correction to provide an image calibration of better precision and accuracy to greatly improve the overall image fidelity. The method involves a process flow which is relatively effective and quick and is suitable for the verification of the optical proximity correction on full chip.

One embodiment of the present invention proposes a method for detecting a photolithographic hotspot, including: receiving layout data; performing an aerial image simulation on the layout data to extract a plurality of aerial image intensity indices including an aerial image intensity maximum ($I_{max}$), an aerial image intensity minimum ($I_{min}$), an aerial image intensity threshold ($I_{th}$) and an aerial image intensity array ($I_{array}$); generating a plurality of aerial image detectors based on the mathematical combination of one or more aerial image intensity indices; determining the position and type of a corresponding photolithographic hotspot in accordance with the value of the aerial image detector; storing a determined hotspot data in a processor-accessible medium.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will be described more fully hereinafter with reference to the accompanying drawings which are part of the specification of the present invention and in which exemplary embodiments of the invention are shown and. As those skilled in the art would realize, the described embodiments may be modified in various different ways, all without departing from the spirit or scope of the present invention.

The components illustrated in the drawing may not be up to scale. Generally speaking, the same reference number indicates similar element in different examples or in different embodiments.

DETAILED DESCRIPTION

Figure 1:
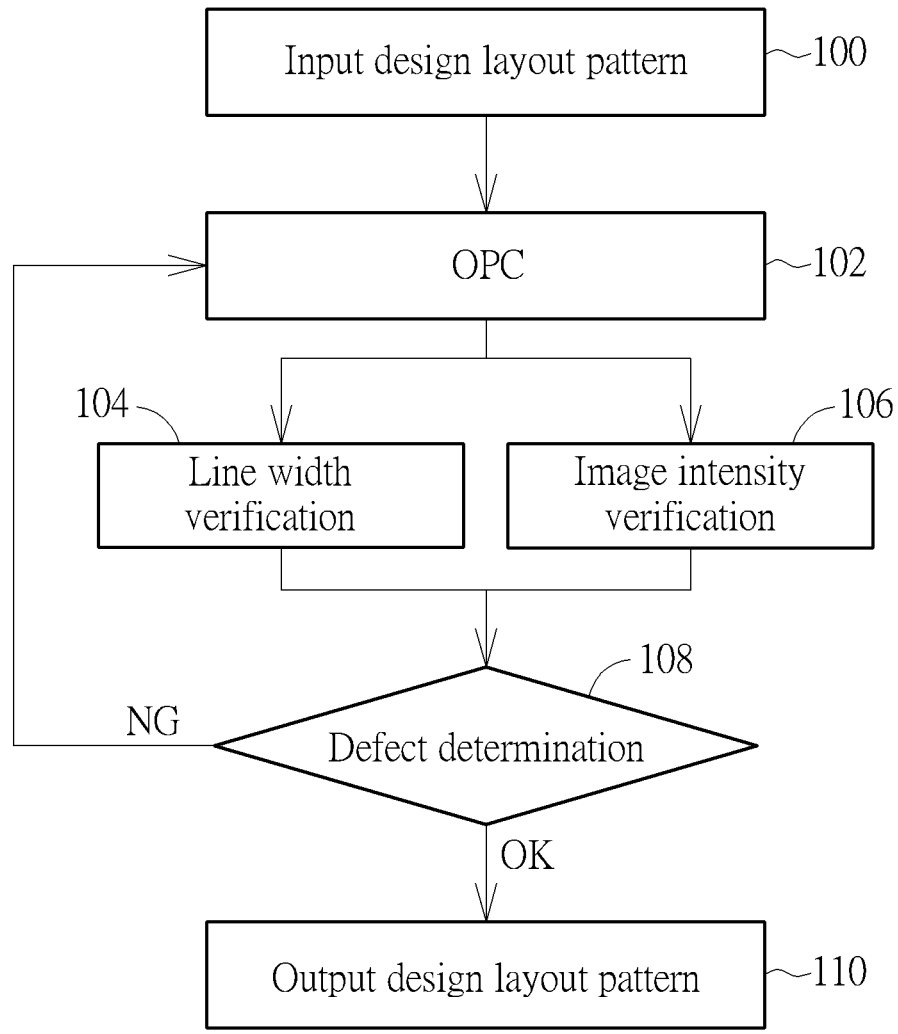
FIG. 1 illustrates a flow chart for the design of the IC layout of the embodiment of the present invention.

The present invention in various aspects relates to aerial images in lithography. The present invention may be variously modified and may have various embodiments. Particular embodiments of the present invention will be described in detail in the Detailed Description. However, the present invention is not limited to the particular embodiments and may be understood that the present invention includes any modification, equivalents, or alternatives that are included in the spirit and scope of the present invention. In the description of the present invention, if it is considered that a detailed description about related disclosed art makes the present invention unclear, it will not be presented herein.

Some techniques described in the specification may be implemented by means of software commands stored in a computer-readable medium, software commands operating in a computer or the combination thereof. For example, some techniques disclosed in the specification are for use in part of the electronic design automation (EDA) tool. These methods may be performed in a single computer or in inter-connected computers. In accordance with the disclosure of the present invention, the software stored in a computer system, such as program codes and/or information data, may be stored in one or more mechanically readable media, including a non-transitory mechanically readable medium. Some general computer-readable media include a soft drive, a hard drive, a magnetic strip or any other magnetic medium, an optical disc or any other optical medium, RAM, PROM, EPROM, flash or any other memory chip or cassette. The above software may be operated in one or more general or specific computers or computer systems or network or other ways.

Although the disclosed method of the present invention is described in a specific order for convenience, it should be understood that the disclosed method of the present invention includes the rearrangement or the combination of the steps unless it is written to give a specific order. For example, the described operational steps in the specification would be rearranged or simultaneously carried out in some occasions. Further, for the purposes of simplicity, the flow chart or the block diagram disclosed in the specification is usually a general illustration without specifically expressing the embodiments in which one particular method is combined with another method. In addition, the detailed descriptions may involve the terms such as 'obtain', 'result in' or 'generate' to describe the disclosed method. These terms are given to describe the actual operations in a highly abstracted way. These actual operations which correspond to these terms differ greatly due to the individual embodiment and it is easily understood by persons of ordinary skills in the art.

Moreover, the term 'layout' used in the specification intends to include the data for describing the entire IC elements. The term 'layout' also intends to include the smaller data group in one or more component (such as part of the integrated circuit elements) in elements. Further, the term 'layout' intends to include the data for describing one or more micro-devices, too, such as the data for forming multiple micro-devices on a wafer.

First please refer to FIG. 1. FIG. 1 illustrates a flow chart for the design of the IC layout of the embodiment of the present invention. The design flow for an IC is generally implemented with the help of a tool like an electronic design automation (DEA) software. A DEA software design flow in general includes multiple sequential steps, steps include such as a system design, logic design, function verification, synthesis and test design, netlist verification, design plot, physical implementation and verification, resolution enhancement.

The embodiments of the present invention are mainly for use in a resolution enhancement flow or in a following verification flow. As shown in step 100, the layout data for inputting here may be the layout data after the above flows and ready for the following optical proximity correction (OPC, step 102) for enhancing the resolution of the layout dada or for correcting potential errors including types such as a critical dimension deviation or a lithographic hotspot in the layout dada. Or, the layout data for inputting here may also be the layout dada after the optical proximity correction so the step 102 may be skipped to directly go to the following verification for critical dimension or for intensity.

The step 102 (optical proximity correction) is for use in correcting or compensating the distortion of the layout pattern on a photoresist after exposure. The techniques take the diffraction of an optical effect into consideration to obtain a pattern or a line width which meets the requirement after the superposition of the generated diffracted light by altering the pattern on the reticle. For example, if a rectangular circuit pattern is needed to be formed on a wafer, the corresponding actual pattern on a reticle is not exactly the same rectangular. Some changes have to be made at the corners to eliminate the corner rounding phenomenon which is cause by the diffraction.

The current optical proximity correction (OPC) includes multiple correction details and algorithm for processing and calculating various pattern distortions. They are not elaborated here in order not to defocus the present invention because they are not the main points of the present invention.

In the embodiments of the present invention, the layout data after the step 102 (optical proximity correction) may continue to go to two steps of the verification, the verification for the line width/critical dimension (step 104) and the verification for the image intensity (step 104) respectively or simultaneously, to examine if the layout pattern after the correction still has potential errors such as the line width deviation or the lithographic hotspots or not. The step 104 line width verification is a regular post-OPC examining step and generally uses specific and effective algorithm to conduct a quick testing and calculating simulation on the layout data after the optical proximity correction to locate the position of a potential defect of a pattern profile. Taken the pattern profile for example, it may involve a line defect such as bridging or necking.

During an implementation, a regular step 104 (the verification for line width) can only find out defects of the profile distortion in the layout pattern due to optical diffraction but fails to take the lithographic defects such as the photoresist residues or damages which are caused by photometric exposure or exposure depth difference into consideration. That is why the embodiments of the present invention propose a distinctive verification step 106 for the image intensity in addition to the regular verification step 104 of line width after OPC. The verification step 106 for image intensity can be carried out along with the verification step 104 of line width at the same time to detect the defect types such as lithographic hotspots which the verification step 104 for line width fails to find out.

The verification flow 106 for image intensity of the present invention includes several steps. Please refer to FIG. 2 which illustrates a process flow chart for detecting lithographic hotspots in accordance with the embodiments of the present invention. First, the design layout data may be input (step 200). The input design layout data here may be the same as the layout data of the verification step 104 of line width after the optical proximity correction. In such a way, it is able to examine if the optical proximity correction step 102 has corrected the potential lithographic hotspots or not. However, under some circumstances, the step 200 may be carried out before the optical proximity correction. In other words, the input data may be the original and uncorrected design layout data.

After the input of the layout data, an aerial image simulation step 202 is carried out on the input layout data. The aerial image simulation takes the reticle, the exposure system and the interaction between photoresist into consideration to conduct a simulation testing and prediction on possible imaging defects on the photoresist after actual exposure of the design layout pattern on the reticle in the exposure system to reduce the unnecessary correction of the defects on the reticle in a later step. The current aerial image simulation has several different principles. For example, Abbe principle is to calculate and to sum up the contribution of every grid point by off-axis illumination. In addition, Hopkins theory is to use a transmission cross-coefficient to first describe the exposure system and later to perform a Fourier transform on the product of the transmission cross-coefficient multiplying a reticle coefficient to obtain the aerial image.

Since the approaches to obtain the aerial images are various and not the main points of the present invention, they are not elaborated here in order not to defocus the present invention. The following directly describes how the present invention processes the information which is obtained from the aerial images and applies it to the detection of hotspots.

Figure 3:
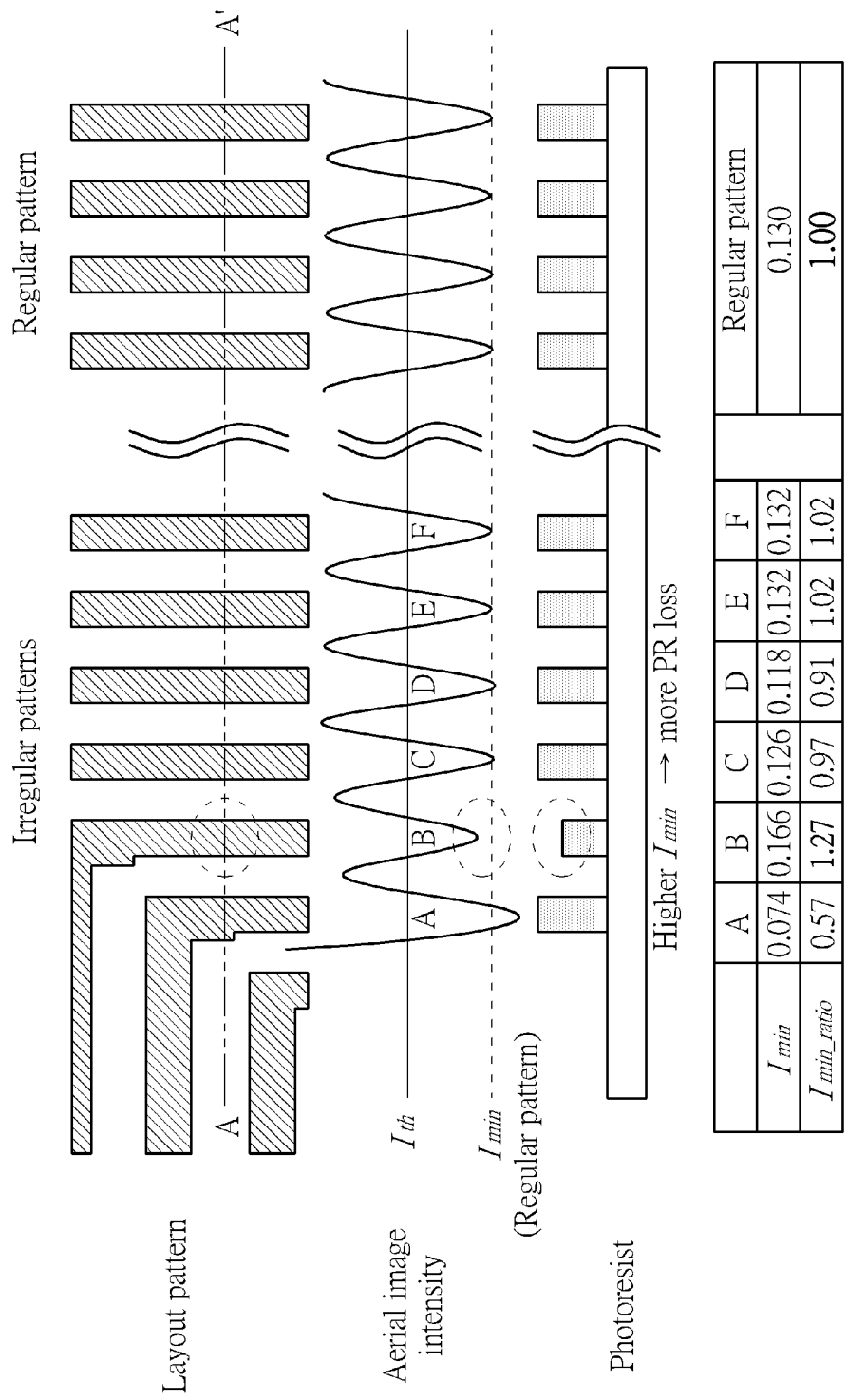
FIG. 3 illustrates the relationship among the layout pattern, the aerial image intensity, the photoresist and the detectors in accordance with the embodiments of the present invention.

After the aerial image simulation step 202 is carried out, how to extract the image intensity-related indices (step 204) from the aerial image data obtained by simulating is described. Please refer to FIG. 3. FIG. 3 illustrates the relationship among the layout pattern, the aerial image intensity, the photoresist and the detectors in accordance with the embodiments of the present invention. As shown in FIG. 3, the upper part of the drawing illustrates a simulated layout pattern by the aerial image simulation. The left side of the upper part illustrates irregular patterns, for example profiles of two directional straight lines and of corner types. The right side of the upper part illustrates a regular array, such as multiple straight lines of equal width, of equal pitch or parallel with each other. Generally speaking, errors such as the profile distortion and the lithographic hotpots are more common in the irregular pattern regions because irregular regions tend to have optical deviations and volatility.

During the actual exposure operation, the image of the layout pattern is formed on the photoresist which is pre-applied on a wafer. The exposure operation generates distinctive intensity distribution on the wafer in accordance with different patterns. The natural or acquired topology of the surface of the wafer makes the illumination form different exposure depth at different positions of the wafer so some positions are just focused and some positions are defocused. It consequently causes different intensity distributions at different positions during the exposure operation.

According to different photoresist used, each type of photoresist has its specific intensity threshold value ($I_{th}$) to serve as the middle value of the aerial image intensity distribution. With the distribution of the patterns on the wafer, each spot has its own minimum intensity ($I_{min}$) and maximum intensity ($I_{max}$). The aerial image intensity distributions in accordance with the above obtained simulated layout patterns are illustrated in the middle of FIG. 3. As shown, regular pattern regions have regular distributions of intensity due to regular profiles. Spots of the same patterns have the same $I_{min}$ and $I_{max}$. In comparison, irregular pattern regions may have distinctive $I_{min}$ and $I_{max}$ at similar spots due to the irregular patterns. This is one of the reasons of the cause of hotspots. For example, there are six similar pattern spots A, B, C, D, E, F of the same profile in the drawing of the marked irregular pattern regions. The patterns C, D, E, F may be regarded as the regular patterns. The pattern A is closest to the region which generates the irregular profiles. The pattern B happens to be sandwiched between the regular profile region and the irregular profile region. As far as the intensity distributions are concerned, it is expected that the spots of the patterns C, D, E, F may have similar $I_{min}$ and $I_{max}$ and the spots of the patterns A, B may have deviations of $I_{min}$ and $I_{max}$. In addition, the regular pattern regions and the irregular pattern regions illustrated on the upper part of FIG. 3 both have major pattern regions with regular patterns of vertical and parallel straight line groups of equal width and of equal pitch. The parameter values (such as line width or pitch) of the straight line groups may obtain an aerial image intensity array value ($I_{array}$) as well. This intensity value may represent the intrinsic intensity value which is given by the decisive regular patterns in different regions on the wafer.

In the examples of the present invention, four aerial image intensity-related indices, namely the intensity threshold value ($I_{th}$, a value related to the photoresist used), the minimum intensity, the maximum intensity ($I_{min}$ and $I_{max}$, values related to the patterns and their positions) and the intensity array value ($I_{array}$, a value related to major decisive regular patterns in the regions), of the spots on the wafer may be extracted (step 204) from the simulated aerial image data after the aerial image simulation step 202 is carried out according to the above descriptions. These four aerial image intensity-related indices are the important parameters of the present invention to detect the positions of the lithographic hotspots.

Back to refer to FIG. 3, the aerial image intensity which distributes at different spots on the wafer later influences the exposure step of the photoresist. As shown in FIG. 3, the lower part illustrates the cross-section of the photoresist pattern of the simulated aerial image patterns generated by the cut region of the line A-A' after the actual exposure operation. The figure shows that maybe the differences of the image intensity do not have great influence on the line width but it makes the resultant photoresist height differ greatly. For example, the $I_{min}$ at B spot is apparently smaller than the $I_{min}$ at other spots so that the actually formed photoresist height is apparently lower than the photoresist height at other spots. Accordingly, under the circumstance of smaller process window, the B spot is very susceptible to PR loss in a following etching process to result in a distorted electric circuit after etching. An overly high $I_{max}$ is otherwise prone to PR residue and results in a distorted electric circuit after etching. Both these two scenarios are supposed to be avoided as much as it can be during the actual fabrication process.

Figure 2:
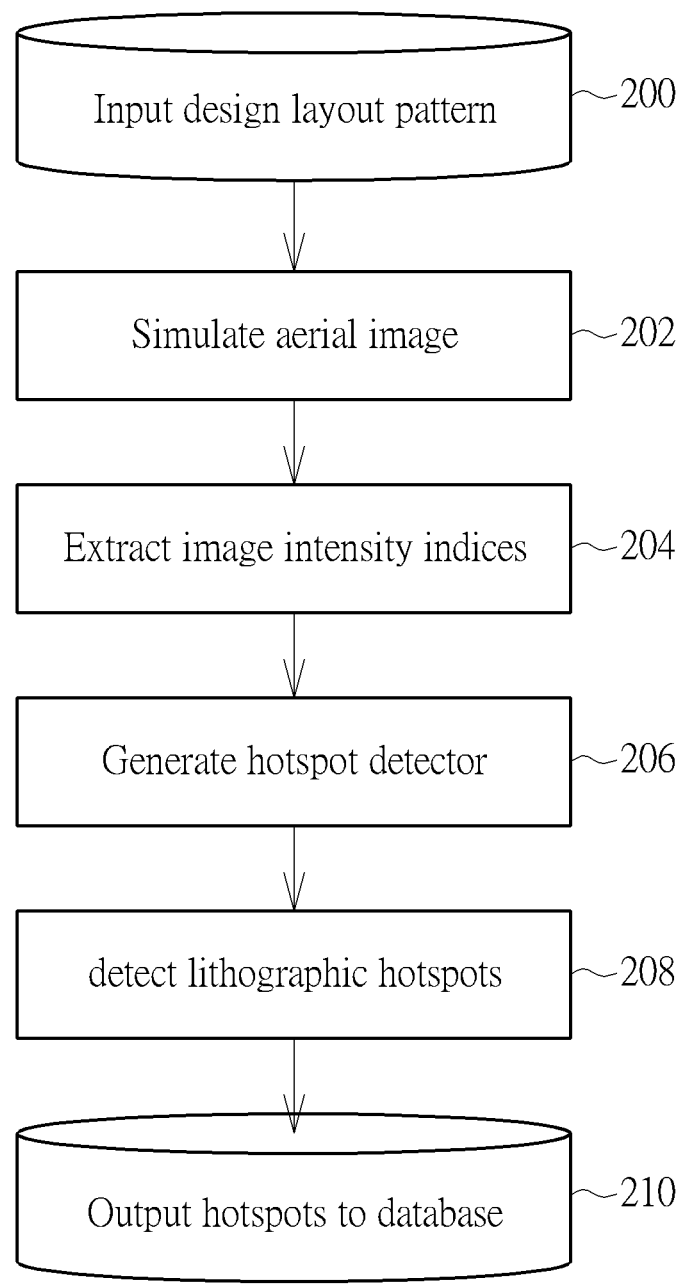
FIG. 2 illustrates a process flow chart for detecting lithographic hotspots in accordance with the embodiments of the present invention.

In the previous examples, the spot B is a potential lithographic hotspot. It cannot be detected by a regular verification for line width like step 104 because it is only detectable after the formation of the photoresist pattern. However, since the present invention proposes the possible principle of the formation of a lithographic hotspot, the present invention therefore proposes corresponding detectors to determine and to detect the positions of this kind of potential lithographic hotspots. As shown in FIG. 2, after the extraction of various aerial image intensity-related indices ($I_{th}$, $I_{min}$, $I_{max}$, $I_{array}$) needed by the embodiments of the present invention, the step 206 for the generation of the detectors for the hotspots proceeds to start.

The followings describe the details of one of the detectors for the detection of the hotspots in the light of the above aerial image intensity embodiments.

Back to refer to FIG. 3, the above describes the cause of the lithographic hotspots of PR loss type because the minimum intensity $I_{min}$ is too low at the spot. A detector ($I_{min\_ratio}$) may be accordingly generated to serve as the reference of determining a lithographic hotspot of PR loss type. The detector ($I_{min\_ratio}$) may operate as shown in the following formula (1):

$$I_{min\_ratio} = I_{min}/I_{array} \qquad (1)$$

In the formula, the intensity array value ($I_{array}$) is related to the representatively major and decisive regular patterns in a given region. To take FIG. 3 of the embodiment for example, the decisive regular patterns in both the regular region and the irregular region are the vertical lines of equal width and of equal pitch so the consistent $I_{min}$ value (=0.130) may be taken as the intensity array value ($I_{array}$), namely the reference basic of the intensity. Such detector ($I_{min\_ratio}$) is an intensity ratio of each region. In a regular region it is constantly 1.00 and in other region it fluctuates in accordance with the local $I_{min}$ value. As it can be seen that the spot B in the figure has an $I_{min}$ value apparently higher than that of other spots, and the corresponding detector ($I_{min\_ratio}$=1.27) is also apparently higher than that of other spots and way over the reference value 1 so it can be determined that the spot B is a potential lithographic hotspot. At the same time, the other spots may be determined not to be possible lithographic hotspots because the corresponding detector values all are with a safer range.

The above example describes one of the methods to generate and to determine the detector corresponding to the lithographic hotspots of PR loss type. Of course, in implementation, there are different detectors corresponding to different lithographic hotspots. Table 1 shows some of the exemplary detectors provided by the present invention but there are not limited to these. Based on the four aerial image intensity-related indices ($I_{th}$, $I_{min}$, $I_{max}$, $I_{array}$) which are extracted in the detector embodiments of the present invention, there are various detectors which correspond to lithographic hotspots of different types and to the related algorithm and criteria. They are dependent upon the variants such as the types of the photoresist, the exposure illumination, types of the electric circuit, types of the lithographic hotspots, and process window . . . etc.

TABLE 1

| detectors | types of lithographic hotspot | possible pattern defects |
|---|---|---|
| $I_{min\_ratio}$ ($I_{min}/I_{array}$) | PR loss | line necking (ADI/AEI) trench bridging (ADI/AEI) |

TABLE 1-continued

| detectors | types of lithographic hotspot | possible pattern defects |
|---|---|---|
| $I_{max/Ith}$ | PR residue insufficient trench pattern clearness | Trench necking (ADI/AEI) line bridging (ADI/AEI) SRAF print out (ADI) |
| $I_{min/Ith}$ | PR loss | trench bridging (ADI/AEI) SRAF print out (ADI) |
| ILS | slope of aerial image intensity near nominal pattern edge | exposure latitude insufficient (ADI) |
| NILS | degree of intensity transition near nominal pattern edge | pattern profile degradation (ADI) exposure latitude insufficient (ADI) |

Table 1 shows some of the exemplary detectors provided by the present invention. It is apparent that the former three detectors are the combination of the aerial image intensity indices which are extracted in step 204. Taken the detector ($I_{min\_ratio}$) for example, it is capable of detecting the lithographic hotspot of PR loss type. With respect to the detector (ILS, image log slope) and the detector (NILS, normalized image log slope), please refer to the following formula (2) and formula (3):

$$ILS = \frac{d\ln(I)}{dx} \qquad (2)$$

$$NILS = w\frac{d\ln(I)}{dx} \qquad (3)$$

w is the critical dimension (CD) of a given pattern.

In the embodiments of the present invention, each detector is a function which is the combination of the aerial image intensity indices and extracted from the aerial image simulation. They correspond to various lithographic hotspots, such as PR loss, PR residue, trench pattern over-development, slope of edge intensity overly large and edge transition intensity overly large. These kinds of lithographic hotspots generate various defects, such as line necking/bridging, trench necking/bridging, SRAF print out, insufficient exposure latitude or pattern profile degradation, in the following steps such as after develop inspection (ADI) or after etch inspection (AEI).

Furthermore, in the embodiments of the present invention, each generated detector gives a determined value or a spec (range) after optimization in accordance with different scenarios, variants such as types of the photoresist, the exposure illumination, types of the electric circuit, types of the lithographic hotspots, and process window . . . etc., in actual processes. Taken the embodiment for example, the determined value of the detector ($I_{min\_ratio}$) is set to be 1.0.

In the following detecting step 208 for the lithographic hotspots, the detector's value of each spot on the wafer is generated and compared with the determined value of the given detector. When the value of the detector of a given spot is larger than or smaller than a set determined value, the spot is determined to be a potential lithographic hotspot. For instance in this embodiment, if a calculated value ($I_{min\_ratio}$) of a detector of a given spot is larger than 1.0, it is marked as a lithographic hotspot. In accordance with the types and with the positions of the detectors, a detecting step 208 for the lithographic hotspots on full chip may obtain many marked lithographic hotspots on the layout pattern. The data of these lithographic hotspots, including position, types, and the corresponding aerial image numeric analysis, may be output to be stored in a database (step 210) to serve as the reference of the layout designers in a later step to modify the layout pattern to eliminate these lithographic hotspots. In such a way, a complete verification step 106 for image intensity of the present invention is finished.

Return to FIG. 1 to refer to the two verification steps (104/106) regarding line width and image intensity. The hotspot database established in the previous step 210 may be utilized along with a line width defect database established in the line width verification step 104 to fully determine (step 108) all kinds of possible defects of a layout pattern, including line width deviation-related defects (generally related to the planar dimensions of the photoresist pattern such as length or width) and the lithographic hotspot-related defects (related to the height, tilt angles or quality of the photoresist pattern). Hence, problems of lithographic hotspot-type defects which were usually not capable of being found by a conventional post-OPC verification step now can be effectively solved.

Generally speaking, if the detected defect exceeds a pre-determined value, the verification step is determined to be failed, the entire flow goes back to the former OPC step 102 and it performs corresponding modifications according to the defects detected in the two verification steps (104/106). The modified design layout pattern undergoes the verification step again and again till no other defects are detected so it is the completion of the layout pattern design flow. After the completion of the design, the layout pattern data is taped out (step 110) for the production of the reticle. After the conventional steps, such as production, assembly, packaging, a final chip product is obtained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting a photolithographic hotspot, comprising:

receiving layout data;

performing an aerial image simulation on said layout data to extract a plurality of aerial image intensity indices comprising an aerial image intensity maximum ($I_{max}$), an aerial image intensity minimum ($I_{min}$), an aerial image intensity threshold ($I_{th}$) and an aerial image intensity array ($I_{array}$), wherein the aerial image intensity array ($I_{array}$) is related to a representatively major and decisive regular pattern in a given region of the layout data;

generating an aerial image detector based on the mathematical combination of said aerial image intensity indices and comprising $I_{min}/I_{array}$, $I_{max}/I_{th}$ and $I_{min}/I_{th}$; and determining the position and the type of a corresponding photolithographic hotspot in accordance with the value of said aerial image detector.

2. The method for detecting a photolithographic hotspot of claim 1, wherein said aerial image detector further comprises an aerial image intensity log slop (ILS) and a normalized aerial image intensity log slop (NILS).

3. The method for detecting a photolithographic hotspot of claim 2, wherein said aerial image detector $I_{min}/I_{array}$ corresponds to a photolithographic hotspot of a line necking or of a trench bridging.

4. The method for detecting a photolithographic hotspot of claim 2, wherein said aerial image detector $I_{max}/I_{th}$ corresponds to a photolithographic hotspot of a trench bridging, of a line necking or of a sub-resolution assist feature (SRAF) print out.

5. The method for detecting a photolithographic hotspot of claim 2, wherein said aerial image detector $I_{min}/I_{th}$ corresponds to a photolithographic hotspot of a trench bridging or of a sub-resolution assist feature (SRAF) print out.

6. The method for detecting a photolithographic hotspot of claim 2, wherein said ILS corresponds to a photolithographic hotspot of insufficient exposure latitude.

7. The method for detecting a photolithographic hotspot of claim 1, wherein said NILS corresponds to a photolithographic hotspot of insufficient exposure latitude or pattern profile degradation.

8. The method for detecting a photolithographic hotspot of claim 1, wherein a photolithographic hotspot database is established in accordance with a pre-determined range of a photolithographic hotspot and with the position and type of said determined photolithographic hotspot after a photolithographic hotspot detection on a full chip.

9. The method for detecting a photolithographic hotspot of claim 1, wherein said layout data are after an optical proximity correction (OPC).

\* \* \* \* \*